United States Patent [19]

Crist

[11] 4,152,392
[45] May 1, 1979

[54] CHEMICAL CANISTER

[75] Inventor: Ralph P. Crist, Harrisburg, Pa.

[73] Assignee: The United States of America as represented by the Secretary of the Navy, Washington, D.C.

[21] Appl. No.: 144,512

[22] Filed: Oct. 11, 1961

Related U.S. Application Data

[62] Division of Ser. No. 734,803, May 12, 1958.

[51] Int. Cl.² .............................................. B01J 7/00
[52] U.S. Cl. ......................................... 422/112; 9/9; 181/140; 181/141; 206/1.5; 206/811; 220/260; 220/326; 422/119; 422/129
[58] Field of Search .................... 23/281; 9/9; 220/55, 220/47, 260, 326; 206/1.5, 811; 181/140, 141; 422/112, 119, 129; 102/96

[56] References Cited

U.S. PATENT DOCUMENTS

| | | | |
|---|---|---|---|
| 1,008,646 | 11/1911 | Kassner | 23/281 |
| 2,752,615 | 7/1956 | Parker | 9/9 |
| 2,861,712 | 11/1958 | Bermingham | 220/315 |
| 3,049,091 | 8/1962 | Carroll et al. | 9/9 |

FOREIGN PATENT DOCUMENTS 571694 9/1945 United Kingdom ..................... 23/281

Primary Examiner—Edward A. Miller
Attorney, Agent, or Firm—R. S. Sciascia; Q. E. Hodges

[57] EXEMPLARY CLAIM

1. A chemical canister for generating gas in a noise-maker beacon comprising a canister case for holding a chemical for generating a buoyant gas, a canister cover adapted to be mounted on said case, a watertight seal between said cover and said case, means for ejecting said cover from said case, and means for temporarily locking said cover and said canister; said ejecting means comprising a conical spring adapted to be compressed within its outer diameter, and said locking means comprising a rod extending from the bottom of said canister to said cover, a groove in said rod near said cover, a locking pin mounted in said cover having one end adapted to lock with said rod by means of said groove and having a piston at the other end, and a locking pin ejecting spring mounted on said pin for moving said locking pin out of engagement with said rod by means of said groove.

3 Claims, 4 Drawing Figures

CHEMICAL CANISTER

The invention described herein may be manufactured and used by or for the Government of the United States of America for governmental purposes without the payment of any royalties thereon or therefor.

This application is a division of application Ser. No. 734,803, filed May 12, 1958, for Noisemaker Beacon.

The present invention relates to a chemical canister and more particularly to a chemical canister for use in the flotation system of an underwater acoustical source such as that described in the above identified application.

The underwater acoustical source referred to is designed to prevent detection of submerged submarines by sonar or hydrophones. The acoustical source generates a wide band, high intensity, random noise and is supported below the surface by a flotation system comprising a balloon inflated by a gas generator. The flotation system is folded, placed in a casing, and stored aboard a submarine. When under attack by an enemy ship which is suspected of having hydrophone or sonar equipment, the submarine launches the noisemaker in an effort to escape undetected.

In these systems an inflatable balloon is supplied with a buoyant gas by means of a canister holding a chemical which will react with sea water to produce the buoyant gas, generally hydrogen. It has been found that when these canisters are used at great depths, a protective layer is formed in the top of the canister thereby preventing the quick formation of any hydrogen gas when the balloon reaches its design operating depth.

These prior devices have a tendency to rise to near the surface of the water and then to oscillate up and down instead of remaining fixed.

It is an object, therefore, of the present invention to provide an improved canister for use in underwater flotation systems.

Another object is the provision of a chemical canister which is capable of producing a relatively constant flow of gas by interaction between chemicals contained therein and water without being affected substantially by external pressures.

In accordance with the present invention a canister case is provided with a spring-loaded cover held into position by a spring-loaded pin which engages a groove cut in a rod that is packed in the center of the case. The cover remains in place keeping the canister sealed until the canister ascends to a depth of about 30 feet, then the spring ejects the cover, permitting water to reach the chemical and liberate the gas required to maintain the flotation elements at the desired depth. The cover thus eliminates the disadvantages inherent in devices having a variable gassing rate and additionally protects the chemical from moisture from the time it is packed until it is assembled.

Other objects and advantages of the invention will hereinafter become more fully apparent from the following description of the annexed drawings, which illustrate a preferred embodiment, and wherein.

Figure 1:
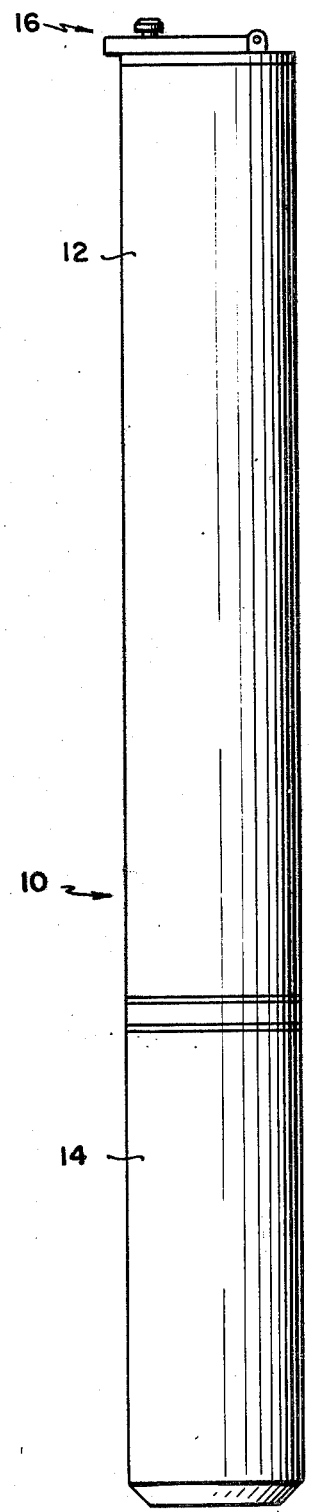
FIG. 1 is a view in elevation of the assembled noisemaker beacon.

Referring now to the drawings, wherein like characters designate like or corresponding parts throughout the several views, there is shown in FIG. 1 an assembled noisemaker beacon indicated at 10 comprising a casing 12 having a noisemaker 14 at the lower end and a trigger assembly 16 at the other end.

In operation the noisemaker beacon is designed for launching from the signal tube of a submarine. The breech of the signal tube is opened and the beacon is inserted in the tube with the noisemaker 14 being inserted first and with the complete beacon being pushed forward in the tube so that there is a space of about eight inches at the rear of the noisemaker.

The breech of the signal tube is then closed and the outer end of the tube is opened to allow the tube to be flooded with water. A rubber diaphragm at the rear of the signal tube is then operated by air pressure which ejects the beacon from the submarine. The trigger mechanism 16 engages a catch as it leaves the signal tube which trips the trigger mechanism. After the trigger mechanism is tripped, a flotation is ejected from the noisemaker casing 12, which flotation is inflatable and raises the beacon up to about a depth of 20 feet below the surface of the water.

The noisemaker, which is set off by a timer, operates to generate a large amount of random noise which effectively jams any sonar or hydrophone systems in the area and interferes with the operation of any acoustic torpedoes.

Figure 2:
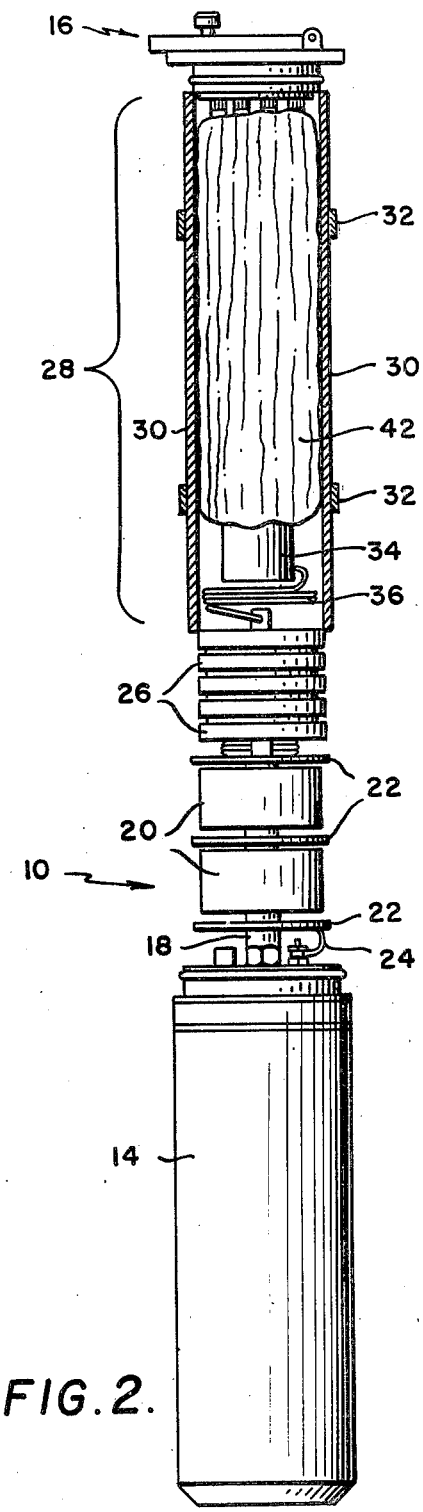
FIG. 2 is a view of the assembled beacon with the casing removed.

As more clearly shown in FIG. 2, where the casing 12 is removed, the noisemaker 14 is shown having an insulated rod 18 for supporting a plurality of sea-cell batteries 20. These sea-cell batteries 20 are of the magnesium-silver chloride type, concentrically wound, and will operate in either fresh or salt water. Insulating spacers 22 are used at each end of and in between the batteries 20. Connections are indicated at 24 for electrical connections to a motor mounted in the noisemaker 14.

A spring ejector 26 rests on the end of the insulating rod 18 in order to expel flotation 28 at the end of the casing. The flotation 28 is mounted within a pair of half sleeves 30, which serve to compress the spring ejector 26 during assembly and also serve to force the trigger mechanism 16 and the flotation 28 into the water after the trigger mechanism 16 is operated. Two split rings 32 serve to temporarily hold the two half sleeves 30 in place during the assembly of flotation 28 when pushed into the casing 12.

Figure 3:
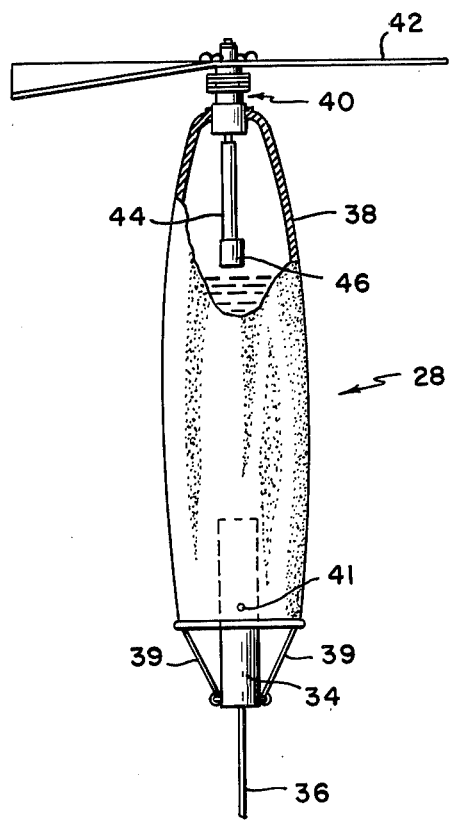
FIG. 3 is a view in elevation showing the flotation as it appears in the operating position.

A chemical canister 34 is attached to the bottom of the flotation 28 for supplying additional gas to an inflatable balloon (see FIG. 3). A nylon cord 36 is attached to the bottom of the chemical canister 34 and runs down through the spring ejector 26 where it is attached to the insulating rod 18. The nylon cord 36 is about 10 feet long with about 10" of it being disposed below the spring ejector 26 so that the cord may pass up through the spring ejector 26 as the ejector 26 expels flotation 28 from the casing 12.

In FIG. 3 is shown a more detailed view of the flotation 28 which brings the noisemaker 14 from the launching depth up to the normal operating depth of 30 feet below the surface and maintains its depth for a period of 20 to 25 minutes. The operating portion of the flotation 28 is a balloon 38 which is made of neoprene-coated nylon fabric. When filled with gas it is six inches in diameter and 24 inches long. Attached to the bottom of the balloon 38 is a chemical canister 34 by means of a screw 41 and two nylon cords 39. The nylon cord 36, which supports the noisemaker 14, is shown extending from the bottom of the canister 34.

A regulating valve 40 is fastened to the balloon 38 at the top thereof, which serves to regulate the depth at which the flotation 28 operates. A folding parachute 42 is mounted at the top of the regulating valve 40. The parachute 42 comprises 8 ribs which are mounted on the plate 43 and normally held in the open position by means of a plurality of springs. One of the ribs has a projection on the center and is held in a locked position once the parachute is open. The purpose of the locking rib is to obtain an angular rise during the time the flotation 28 is coming up to the operating depth, thereby preventing any masking of the noisemaker 14 by the gas bubbles from the sea-cell battery 20 or balloon 38.

A gas escape tube 44 is attached to the bottom of regulating valve 40 and a brass adapter and screen 46 are attached to the bottom of the gas escape tube 44. The gas escape tube 44 serves to regulate the amount of enclosed gas or buoyancy in the balloon 38 and its length can be varied in order to adjust the depth at which the flotation 28 will operate. The brass adapter 46 is provided to cause the tube 44 to hang in a vertical position, and the screen is attached to prevent the chemical in the balloon 38 from blocking the end of the tube.

100 grams of granular (18-30 mesh) lithium hydride are placed within the balloon 38 and the balloon is folded so that the chemical is protected from contact with the water until after the flotation 28 is ejected from the casing 12. After launching the beacon, the trigger mechanism 16 is tripped, thereby allowing water to flow into the beacon. As soon as the water strikes the chemical, hydrogen gas is liberated to fill the balloon 38, which brings it up to the operating position. The loose lithium hydride particles will react immediately with water regardless of the depth at which the beacon is launched.

Figure 4:
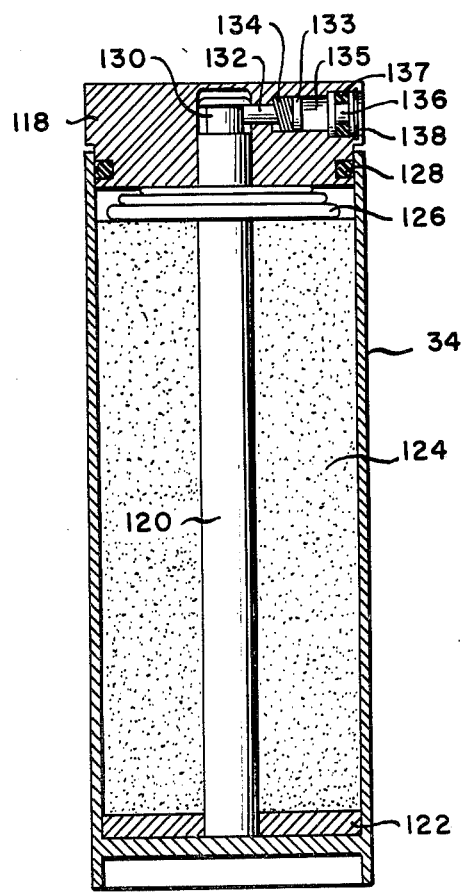
FIG. 4 is a view, partly in cross-section, of the chemical canister.

A detail view, partly in cross-section, of the chemical canister 34 is shown in FIG. 4. A cover 118 is shown mounted on top of the chemical canister of case 34 and sealed by means of an O-ring 128. A rod 120 is mounted in the center of the canister and slides into a disk 122. 90 grams of lithium hydride packed under a pressure of 10 tons are indicated at 124. A conical spring 126 mounted coaxial with the rod 120 is placed on top of the chemical 124 and acts to eject the cover 118. A groove 130 at the top of the rod 120 engages a release pin 132 having a shoulder 133 on the other end. A spring 134 moves the shoulder 133 and release pin 132 at the proper time. A piston 136 having an O-ring seal 137 is shown at the outer end of the chamber 135 which supports the release pin 132. A retaining ring 138 holds this piston 136 in place.

When the beacon is launched the water entering the beacon forces the canister cover 118 down until the cover 118 hits the canister or case 34. At this time the spring 134 forces the release pin 132 to the right as shown in FIG. 4. The pressure of the water holds the canister cover 118 down against the canister or case 34 despite the pressure of conical spring 126 until, at a depth of about 40 feet, the conical spring 126 ejects the cover 118 and allows the water to react with the chemical and liberate the hydrogen gas required to maintain the flotation 28 at the desired depth.

Performance tests demonstrated the need for the cover because the gassing rate of the chemical is retarded with the increase in the pressure, and at a depth of about a thousand feet, the chemical gassing rate is negligible. Actually, a protective layer is formed on the top of the canister when subjected to high pressures, and when the pressure is released, it takes considerable time before the chemical reaches a normal gassing rate. The cover also serves to protect the chemical from moisture from the time it is packed until it is assembled in the beacon. The piston 136 and seal 137 keep moisture and sea water from passing through the chamber 135 and around the rod 120 and conical spring 126 and onto the chemical during storage and launching of the beacon.

It will be realized that although the chemical canister has been described herein with reference to a flotation system for a noisemaker beacon, it may be useful in other and different combinations.

It will also be realized that, obviously, many modifications and variations of the present invention are possible in the light of the above teachings. It is, therefore, to be understood that, within the scope of the appended claims, the invention may be practiced otherwise than as specifically described.

What is claimed is:

1. A chemical canister for generating gas in a noisemaker beacon comprising a canister case for holding a chemical for generating a buoyant gas, a canister cover adapted to be mounted on said case, a watertight seal between said cover and said case, means for ejecting said cover from said case, and means for temporarily locking said cover and said canister; said ejecting means comprising a conical spring adapted to be compressed within its outer diameter, and said locking means comprising a rod extending from the bottom of said canister to said cover, a groove in said rod near said cover, a locking pin mounted in said cover having one end adapted to lock with said rod by means of said groove and having a piston at the other end, and a locking pin ejecting spring mounted on said pin for moving said locking pin out of engagement with said rod by means of said groove.

2. A chemical canister for generating gas for an underwater flotation system, comprising a canister case for holding a chemical for generatiang a buoyant gas, a canister cover mounted on said case, a watertight seal including an O-ring between said cover and said case, means for ejecting said cover from said case and means for temporarily locking said cover and said canister; said ejecting means comprising a conical spring adapted to be compressed within its outer diameter and said locking means comprising a rod extending from the bottom of said canister to said cover, a groove in said rod near said cover, a locking pin mounted in said cover having one end adapted to lock with said rod by means of said groove and having a piston at the other end, and a locking pin ejecting spring mounted on said pin for moving said locking pin out of engagement with said rod by means of said groove.

3. A chemical canister comprising a canister case for holding a chemical, a canister cover adapted to be mounted on said case, and means for temporarily locking said cover and said canister case, said locking means comprising a rod extending from the bottom of said canister case to said cover, a groove in said rod near said cover, a locking pin mounted in said cover having one end adapted to lock with said rod by means of said groove and having a piston at the other end, and a locking pin ejecting spring mounted on said pin for moving said locking pin out of engagement with said rod by means of said groove.

* * * * *